(12) United States Patent
Rasmussen

(10) Patent No.: US 7,609,755 B2
(45) Date of Patent: Oct. 27, 2009

(54) SIMPLIFIED TIMING CORRECTION FOR DATA DESPREADING OF SERIAL OFFSET QUADRATURE PULSE-SHAPED SPREAD SIGNALS

(75) Inventor: Donald John Rasmussen, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 700 days.

(21) Appl. No.: 11/313,476

(22) Filed: Dec. 21, 2005

(65) Prior Publication Data
US 2008/0101442 A1    May 1, 2008

Related U.S. Application Data

(60) Provisional application No. 60/703,373, filed on Jul. 28, 2005.

(51) Int. Cl.
H04B 1/00 (2006.01)
(52) U.S. Cl. .................................. 375/149; 375/259
(58) Field of Classification Search .................. 375/130, 375/142, 145, 149–150, 259, 365, 367
See application file for complete search history.

(56) References Cited

U.S. PATENT DOCUMENTS

| | | |
|---|---|---|
| 3,938,045 A | 2/1976 | Mathwich |
| 4,057,759 A | 11/1977 | Genova et al. |
| 4,516,087 A | 5/1985 | Bruene |
| 5,157,693 A | 10/1992 | Lemersal, Jr. et al. |
| 5,177,765 A | 1/1993 | Holland et al. |
| 5,195,108 A | 3/1993 | Baum et al. |
| 5,732,106 A | 3/1998 | Rasmussen et al. |
| 5,818,867 A | 10/1998 | Rasmussen |

(Continued)

FOREIGN PATENT DOCUMENTS

EP    1 117 186 A1    7/2001

OTHER PUBLICATIONS

Carl Andren, "Short PN Sequences for Direct Sequences Spread Spectrum Radios", Apr. 11, 1997, pp. 1-4.

(Continued)

*Primary Examiner*—Jean B Corrielus
(74) *Attorney, Agent, or Firm*—RatnerPrestia

(57) ABSTRACT

A simplified timing correction method is provided for data despreading of serial offset quadrature pulse-shaped spread signals. The simplified timing correction algorithm is applied to a rake receiver for improved performance in a multi-path channel. Serial formatting of the spreading modulation waveform is selected to reduce the SYNC/serial probe correlation complexity. The method includes the steps of: (a) decimating serial inphase (I) and quadrature (Q) signals to form decimated I and Q even samples and decimated I and Q odd samples; (b) obtaining an autocorrelation profile of a spreading sequence used by the receiver; (c) detecting a synchronization starting point using the I and Q even samples; and (d) deciding to either move, or not move, the synchronization starting point, based on the autocorrelation profile obtained in step (b). Step (d) decides to move the synchronization starting point, and uses the I and Q odd samples for subsequent despreading of the I and Q signals. Step (d) also decides not to move the synchronization starting point, and uses the I and Q even samples for subsequent despreading of the I and Q signals.

21 Claims, 9 Drawing Sheets

U.S. PATENT DOCUMENTS

| | | | |
|---|---|---|---|
| 6,002,710 | A | 12/1999 | Hendrickson et al. |
| 6,181,755 | B1 * | 1/2001 | Junell .......................... 375/362 |
| 6,674,790 | B1 | 1/2004 | Rasmussen et al. |
| 6,687,316 | B1 * | 2/2004 | McGraw ..................... 375/343 |
| 6,831,940 | B2 * | 12/2004 | Harms et al. ................ 375/130 |
| 6,859,463 | B1 | 2/2005 | Mayor et al. |
| 7,142,585 | B2 * | 11/2006 | Baltersee et al. ............ 375/148 |
| 7,324,559 | B2 * | 1/2008 | McGibney ................... 370/509 |
| 7,333,532 | B2 * | 2/2008 | Baltersee et al. ............ 375/148 |
| 2001/0014114 | A1 * | 8/2001 | Baltersee et al. ............ 375/148 |
| 2002/0181438 | A1 * | 12/2002 | McGibney ................... 370/350 |
| 2006/0098719 | A1 * | 5/2006 | Baltersee et al. ............ 375/148 |

OTHER PUBLICATIONS

John Fakatselis, "Processing Gain for Direct Sequence Spread Spectrum Communication Systems and Prism®", Intersil Corporation, 2000, pp. 1-4.

Chris Heegard et al., "High-Performance Wireless Ethernet", IEEE, Nov. 2001, pp. 64-73.

* cited by examiner

SIMPLIFIED TIMING CORRECTION FOR DATA DESPREADING OF SERIAL OFFSET QUADRATURE PULSE-SHAPED SPREAD SIGNALS

CROSS REFERENCE TO RELATED APPLICATIONS

This application claims priority of U.S. Provisional Patent Application Ser. No. 60/703,373, filed Jul. 28, 2005.

STATEMENT REGARDING FEDERALLY SPONSORED RESEARCH

This invention was made with Government Support Under Agreement No. DAAB07-03-9-K601 awarded by the United States Army. The Government has certain rights in the invention.

TECHNICAL FIELD

The present invention relates, in general, to communication systems. More specifically, it relates to timing correction for data de-spreading of serial offset quadrature pulse-shaped spread signals (such as phase shift keyed (PSK) signals).

SUMMARY OF THE INVENTION

To meet this and other needs, and in view of its purposes, the present invention provides a method of correcting synchronization error, by a receiver, upon detecting a serial offset quadrature pulse shaped signal. The method includes the steps of: (a) decimating serial in phase (I) and quadrature (Q) signals to form decimated I and Q even samples and decimated I and Q odd samples; (b) obtaining an autocorrelation profile of a spreading modulating signal used by the receiver; (c) detecting a synchronization starting point using the I and Q even samples; and (d) deciding to either move, or not move, the synchronization starting point, based on the autocorrelation profile obtained in step (b). Step (d) may decide to move the synchronization starting point, and use the I and Q odd samples for subsequent despreading of the I and Q signals. Step (d) may also decide not to move the synchronization starting point, and use the I and Q even samples for subsequent despreading of the I and Q signals. Step (d) decides to move, or not move the synchronization starting point by one chip interval. Step (a) decimates the serial I and Q signals from at least two samples per chip to a reduced sampling rate to one sample per chip.

In another embodiment, the present invention provides a system for correcting timing in a quadrature pulse-shaped spread signal receiver. The system includes: a demodulator front end of the receiver, for receiving a modulated signal and outputting digitized inphase (I) and quadrature (Q) signals; a phase rotator, coupled to the demodulator, for receiving the digitized I and Q signals and outputting serial I and Q signals; a decimator, coupled to the phase rotator, for receiving the serial I and Q signals and outputting decimated even sampled I and Q signals; a SYNC detection module, coupled to the decimator, for receiving the decimated even sampled I and Q signals and outputting a plurality of rake tap locations and rake tap timing corrections for the respective rake tap locations; and a rake tap processing section, coupled to the SYNC detection module, for receiving the serial I and Q signals and the rake tap timing corrections for outputting I and Q symbols for subsequent data processing.

In still another embodiment, the present invention provides a method of timing a correction for demodulation of a quadrature pulse shaped signal. The method includes the steps of: (a) obtaining serial I and Q signals from the quadrature pulse shaped signal; (b) decimating the serial I and Q signals to obtain even and odd I samples and even odd Q samples; (c) selecting the even or the odd samples for each of a plurality of rake taps based on a correlation profile of the serial I and Q signals; (d) obtaining I and Q symbols for each of the rake taps by despreading either the even or the odd I and Q samples, based on the determination in step (c); and (e) combining the I and Q symbols of each of the rake taps to form combined I and Q symbols for subsequent data processing. Step (b) includes decimating the serial I and Q signals to a sample rate of one sample per chip. Step (c) includes (i) obtaining an autocorrelation profile of a spreading modulating signal used by the receiver; (ii) determining a crosscorrelation profile of the serial I and Q signals; (iii) detecting a synchronization starting point using the even I and Q samples; and (iv) moving the synchronization starting point by one chip interval, based on the autocorrelation profile obtained in step (i) and the crosscorrelation profile determined in step (ii). Step (d) includes obtaining the I and Q symbols by despreading the odd I and Q samples immediately following the synchronization starting point, when the correlation profile calculated in step (ii) is centered to the right of the autocorrelation profile calculated in step (i). Step (d) also includes obtaining the I and Q symbols by despreading the odd I and Q samples immediately preceding the synchronization starting point, when the correlation profile calculated in step (ii) is centered to the left of the autocorrelation profile calculated in step (i).

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
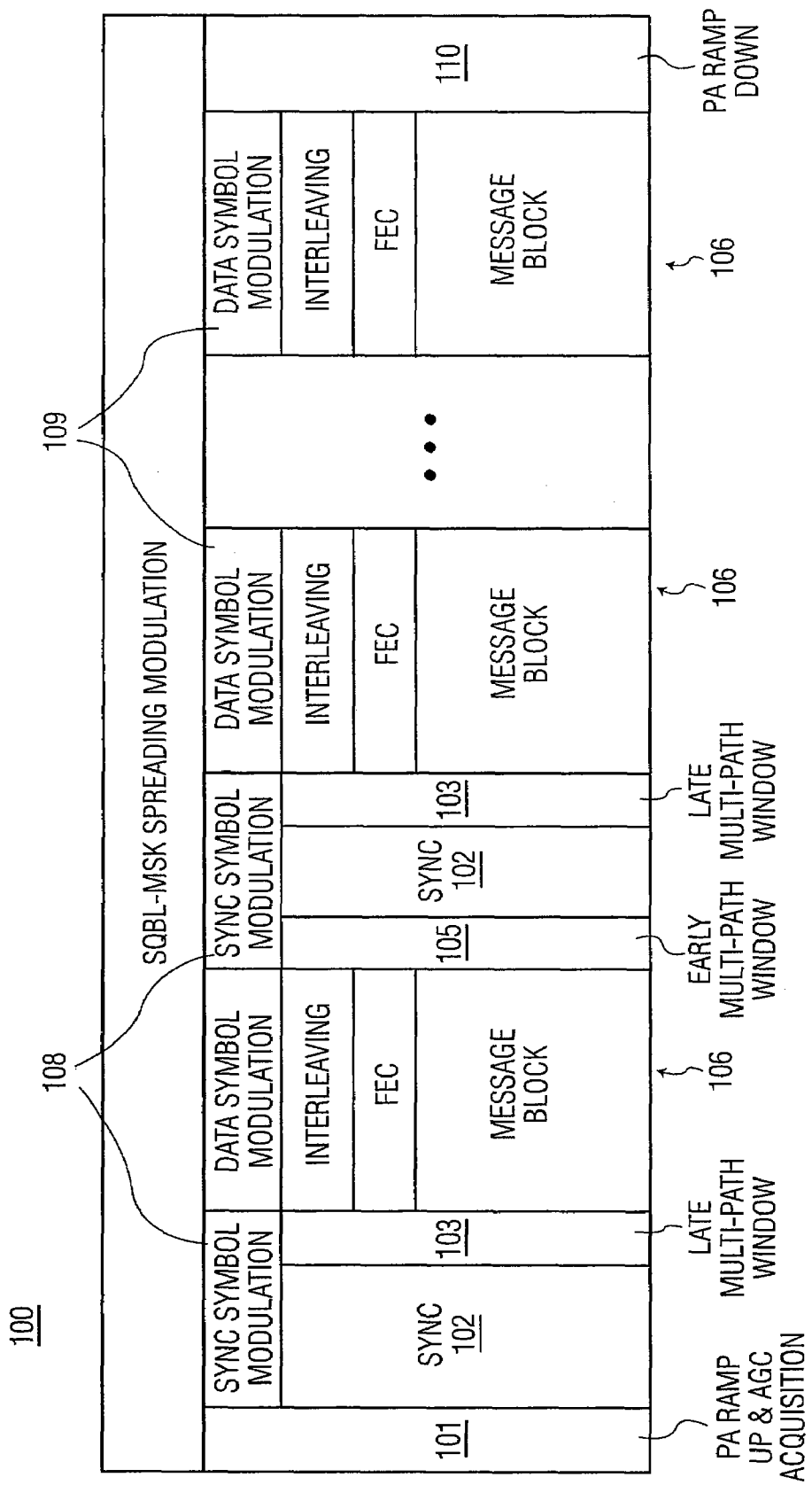
FIG. 1 is a block diagram illustrating a typical waveform structure consisting of the SYNC and Serial Probes within a message waveform packet.

One embodiment of the invention provides a simplified timing correction algorithm for data despreading of serial offset quadrature pulse-shaped spread signals. This simplified timing correction algorithm may be applied to a Rake receiver for improved performance in a multi-path channel. Serial formatting of the spreading modulation waveform is selected to reduce the SYNC/Serial Probe correlation complexity. This SYNC/Serial Probe technique may also be applied to a demodulator architecture that uses four correlators, by making the appropriate changes to the correlation structure.

In alternate embodiments of the invention, other than those implementing the QBL-MSK spreading modulation signal, the timing correction algorithm may be applied to other quadrature modulation waveforms such as offset quadrature phase shift keying (OQPSK), minimum shift keying (MSK), Gaussian MSK, tamed frequency modulation (TFM), intersymbol jitter free offset quadrature phase shift keying (IJF-OQPSK), raised cosine filtered offset quadrature phase shift keying (RC-OQPSK), and bandwidth efficient continuous phase modulation (CPM) schemes. To simplify the SYNC/Serial Probe algorithm, serial formatting of these waveforms is desirable. The timing correction algorithm may also be applied to binary phase shift keying (BPSK) or filtered BPSK, where serial formatting is not required to provide the reduced SYNC correlation structure.

Serial QBL-MSK (SQBL-MSK) is used for the serial offset quadrature pulse-shaped spread modulation waveform enabling a serial correlation structure to be used, which requires an inphase (I) and quadrature (Q) correlator using the same synchronization (SYNC) sequence. Parallel QBL-MSK, on the other hand, may require a four correlator structure based on the even and odd chips in the I and Q sequence.

The serial correlation structure used for synchronization (SYNC) detection provides a simplified BPSK correlation operation versus the parallel structure, thereby reducing the complexity in the SYNC detection. Although QBL-MSK is selected as the exemplary modulation waveform, other offset quadrature pulse-shaped spread modulation waveforms such as MSK, Gaussian MSK, OQPSK, RC-OPSK, and others, for example, may be used for the modulation. To simplify the SYNC detection processes, it may be desirable to implement serial formatting on these other waveforms.

Serial formatting for quadrature pulse-shaped signals may be provided by adding a serial formatting term to the modulation waveform, thereby multiplying the non-return to zero (NRZ) chip sequence with a repetitive 1, 1, −1, −1 sequence. For SQBL-MSK, the basic modulation waveform for the SYNC and serial probe sections of the waveform may be written as:

$$s(t) = \left[\sum_{i=0}^{M-1}(-1)^i c_{2i} \cdot p(t - 2iT_c)\right]\cos(2\pi f_o t) + \left[\sum_{i=0}^{M-1}(-1)^i c_{2i+1} \cdot p(t - [2i+1]T_c)\right]\sin(2\pi f_o t) \quad \text{(eqn 1)}$$

and $$p(t) = \begin{cases} \left[\dfrac{\sin\left(\dfrac{\pi t}{2T_c}\right)}{\left(\dfrac{\pi t}{2T_c}\right)}\right]^3 ; & -2T_c \le t \le 2T_c \\ 0; & \text{elsewhere.} \end{cases} \quad \text{(eqn 2)}$$

For the data modulated SQBL-MSK waveform equation, given above, $T_c$ represents the chip period, $c_i$ represents the chip at time $iT_c$, 2M is the number of chips in the SYNC and serial probe sections of the modulated signal, p(t) is the QBL pulse-shaping function, $f_o$ is the carrier center frequency, and the $(-1)^i$ terms, which multiply the chip values, represent the serial formatting. The chips ($c_i$) which spread the modulated SYNC symbols take on either a +1 or −1 value.

The SYNC sequence is placed at the beginning of the waveform to establish SYNC and use the known SYNC sequence to estimate the channel and select the proper RAKE taps for the demodulation. Serial probes are inserted between message blocks to update the channel estimation and select the new RAKE taps based on the new measurement.

FIG. 1 shows a typical waveform structure 100 including a PA ramp up and AGC acquisition block 101 followed by the SYNC and serial probes within a message waveform packet, and ending in a PA ramp down block 110. As illustrated, SYNC section 102 of the waveform occurs at the beginning of the waveform to establish synchronization in the receiver and estimate the channel. Serial probes are placed around the message blocks 106 to maintain synchronization and update the channel estimates. To minimize cross-correlation degradation between message chips 106 and SYNC chips 102 for multi-path RAKE tap calculations, a late multi-path window 103 may be added to the waveform.

For serial probes, an early and late multi-path window 105 and 103, respectively, may be added to prevent cross-correlation degradation in the RAKE tap calculations introduced between message chips and serial probe chips. Depending on the SYNC and serial probe waveform structure, symbol modulation 108 may be added. In one embodiment, symbol modulation 108 is added to break the SYNC/serial probe process into coherent and noncoherent detection processes. First, the chips in a symbol are coherently combined using a sliding chip correlation process for both the received inphase (I) and quadrature (Q) signal. The I and Q symbol outputs of the sliding correlation process are noncoherently combined in the symbol sliding correlation. Symbol modulation 108 may be added using one of two methods, for example.

A first method uses binary phase shift keyed (BPSK) or differential BPSK (DBPSK) to place symbol modulation on the spreading sequence. A second method uses two unique spreading codes with low cross-correlation properties to transmit either a +1 or −1 symbol. Modifications to equation 1 may be introduced to show the symbol modulation techniques discussed; however, the implementation of the SYNC/serial probe does not impact the fine timing alignment process. For this reason, the simple SYNC/serial probe structure is used to demonstrate how the fine timing alignment process works.

Figure 2:
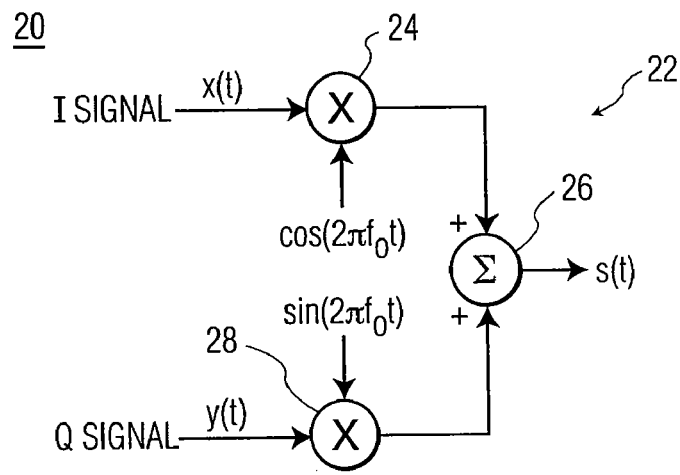
FIG. 2 is a block diagram of an SQBL-MSK module of a transmitter, in accordance with an embodiment of the present invention.

FIG. 2 shows a block diagram for the SQBL-MSK modulator 22 of transmitter 20, with I {x(t)} and Q {y(t)} signals modulating the carrier using SQBL-MSK spreading. As shown, the I and Q data signals are mixed with a carrier signal at mixers 24 and 28. The outputs from mixers 24 and 28 are then combined by summer 26. The resulting signal is a RF modulated signal, s(t), represented by the following equation:

$$s(t) = x(t)\cos(2\pi f_o t) + y(t)\sin(2\pi f_o t). \quad \text{(eqn 2a)}$$

Transmitter 20 transmits the RF modulated signal s(t). The equations for the I {x(t)} and Q {y(t)} signals modulating the carrier during the SYNC and serial probe sections of the waveform are obtained from equation 1:

$$x(t) = \left[\sum_{i=0}^{M-1} (-1)^i c_{2i} \cdot p(t - 2iT_c)\right] \quad \text{(eqn 3)}$$

and $$y(t) = \left[\sum_{i=0}^{M-1} (-1)^i c_{2i+1} \cdot p(t - [2i+1]T_c)\right]. \quad \text{(eqn 4)}$$

Figure 3:
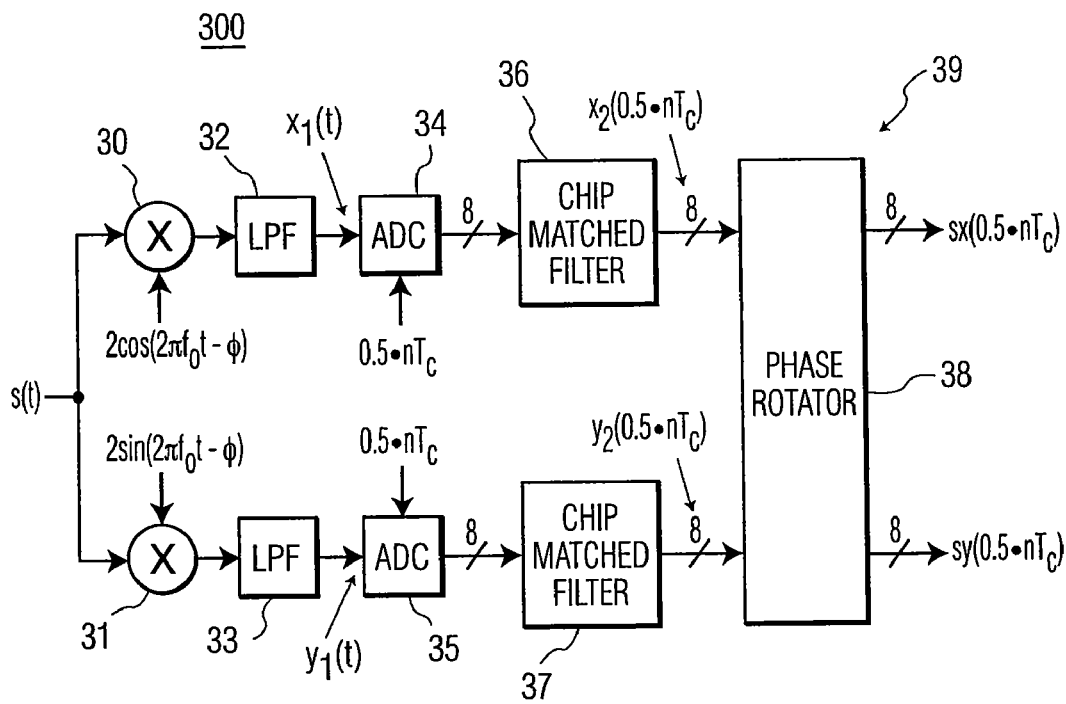
FIG. 3 is a block diagram of an SQBL-MSK demodulator front end of a receiver, in accordance with an embodiment of the present invention.

FIG. 3 shows a block diagram for SQBL-MSK demodulator front-end 39 of receiver 300, which down-converts the received signal to baseband I and Q signals, digitizes the I and Q signals, and digitally filters the I and Q signals with the chip matched filter. First the received signal is mixed using mixers 30 and 31 with a quadrature signal at the carrier frequency, resulting in the desired baseband I and Q signals (mixing difference term) and the undesired signal at twice the carrier frequency (mixing sum term).

Following the down-converter function, low-pass filters 32 and 33 remove the undesired mixing summation term. Baseband I and Q signals are then digitized (into an 8-bit signal, for example) by the I and Q analog-to-digital converters (ADC) 34 and 35. As shown in FIG. 3, the sampling rate is equal to twice the chip rate. Following digitization, the I and Q signals are filtered by chip matched filters 36 and 37, which increase the signal-to-noise ratio (SNR). Phase rotator 38 converts the I and Q chip matched filter outputs to a serial I and Q signal, which is sent to the SYNC detection operation and demodulation section (shown in FIG. 7).

The QBL-MSK chip matched filter coefficients may be based on a QBL-MSK pulse-shaping function defined by:

$$p(t) = \begin{cases} \left[\dfrac{\sin\left(\dfrac{\pi[t-2T_c]}{2T_c}\right)}{\left(\dfrac{\pi[t-2T_c]}{2T_c}\right)}\right]^3 ; 0 \le t \le 4T_c \\ 0; \text{elsewhere.} \end{cases} \quad \text{(eqn 5)}$$

where $T_c$ corresponds to the chip period for the SYNC sequence. Since the QBL-MSK pulse-shaping function is non-zero over a four chip period interval, the digital QBL-MSK chip matched filter operating at twice the chip rate consists of 9 samples defined by:

$$p(k) = \left[\dfrac{\sin\left(\dfrac{\pi[0.5 \cdot k - 2]}{2}\right)}{\left(\dfrac{\pi[0.5 \cdot k - 2]}{2}\right)}\right]^3 ; k = 0, 1, 2, 3, \ldots, 8. \quad \text{(eqn 6)}$$

Recognizing that the filter value for k equal to 0 and 8 are equal to zero, the digital QBL-MSK chip matched filter response can be simplified to 7 samples defined by the following:

$$p(k) = \left[\dfrac{\sin\left(\dfrac{\pi[0.5 \cdot k - 1.5]}{2}\right)}{\left(\dfrac{\pi[0.5 \cdot k - 1.5]}{2}\right)}\right]^3 ; k = 0, 1, 2, 3, \ldots, 6. \quad \text{(eqn 7)}$$

Figure 4:
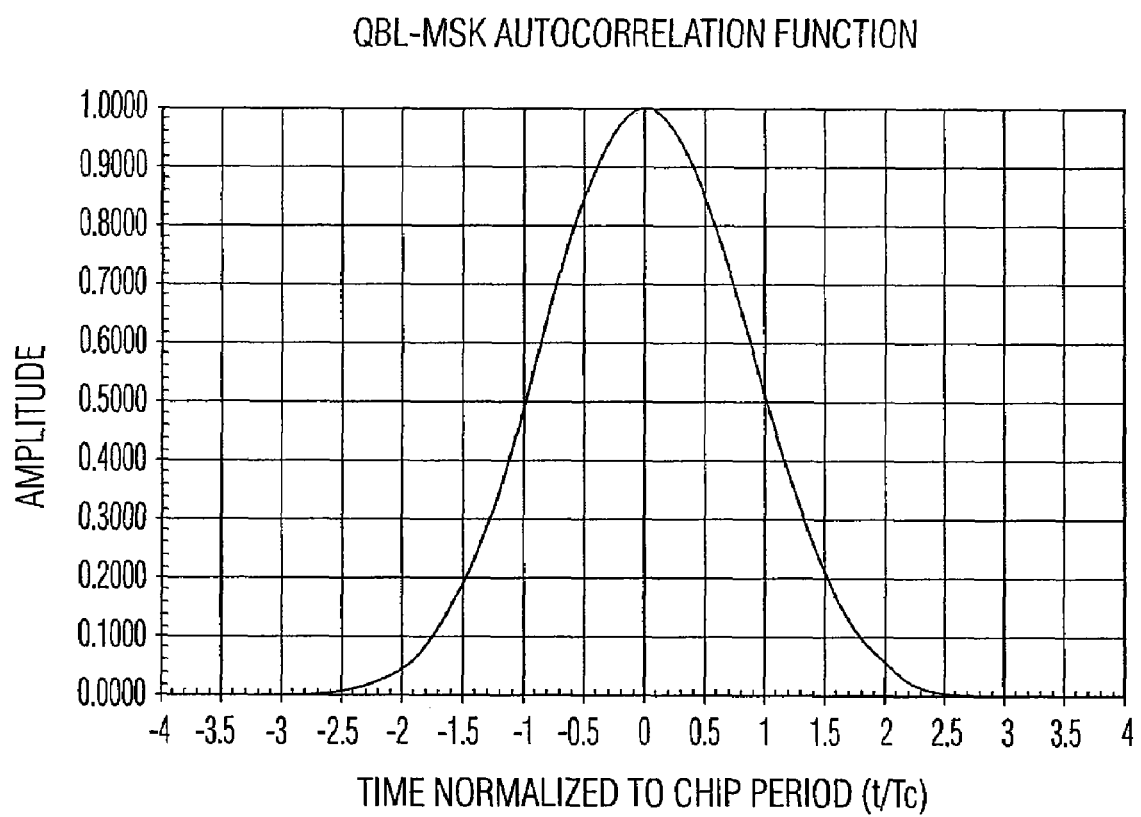
FIG. 4 is a plot of a QBL-MSK autocorrelation function, in accordance with an embodiment of the present invention.

Convolution of the QBL-MSK chip pulse shape with the QBL-MSK chip matched filter results in the QBL-MSK autocorrelation function {g(t)}. FIG. 4 is a plot of an exemplary QBL-MSK autocorrelation function {g(t)}. As shown in FIG. 4, the autocorrelation function is approximately zero at times 2.5 $T_c$ from the desired optimum sampling point (i.e., time 0).

Using the exemplary QBL-MSK autocorrelation function {g(t)}, the I and Q signals out of the chip matched filter are:

$$x_2(0.5nT_c) = \left[\sum_{i=0}^{M-1}(-1)^i c_{2i} \cdot g(0.5nT_c - 2iT_c)\right]\cos(\phi) + \quad \text{(eqn 8)}$$
$$\left[\sum_{i=0}^{M-1}(-1)^i c_{2i+1} \cdot g(0.5nT_c - [2i+1]T_c)\right]\sin(\phi)$$

and $$y_2(0.5nT_c) = -\left[\sum_{i=0}^{M-1}(-1)^i c_{2i} \cdot g(0.5nT_c - 2iT_c)\right] \quad \text{(eqn 9)}$$
$$\sin(\phi) + \left[\sum_{i=0}^{M-1}(-1)^i c_{2i+1} \cdot g(0.5nT_c - [2i+1]T_c)\right]\cos(\phi)$$

where $\phi$ is the carrier phase change.

The phase rotator enables the SQBL-MSK modulated signal to be serially demodulated, enabling the SYNC I and Q correlation operations to operate against the same SYNC chip sequence rather than having to separate the SYNC chip sequence into even and odd chips as required by a parallel correlator.

Figure 5:
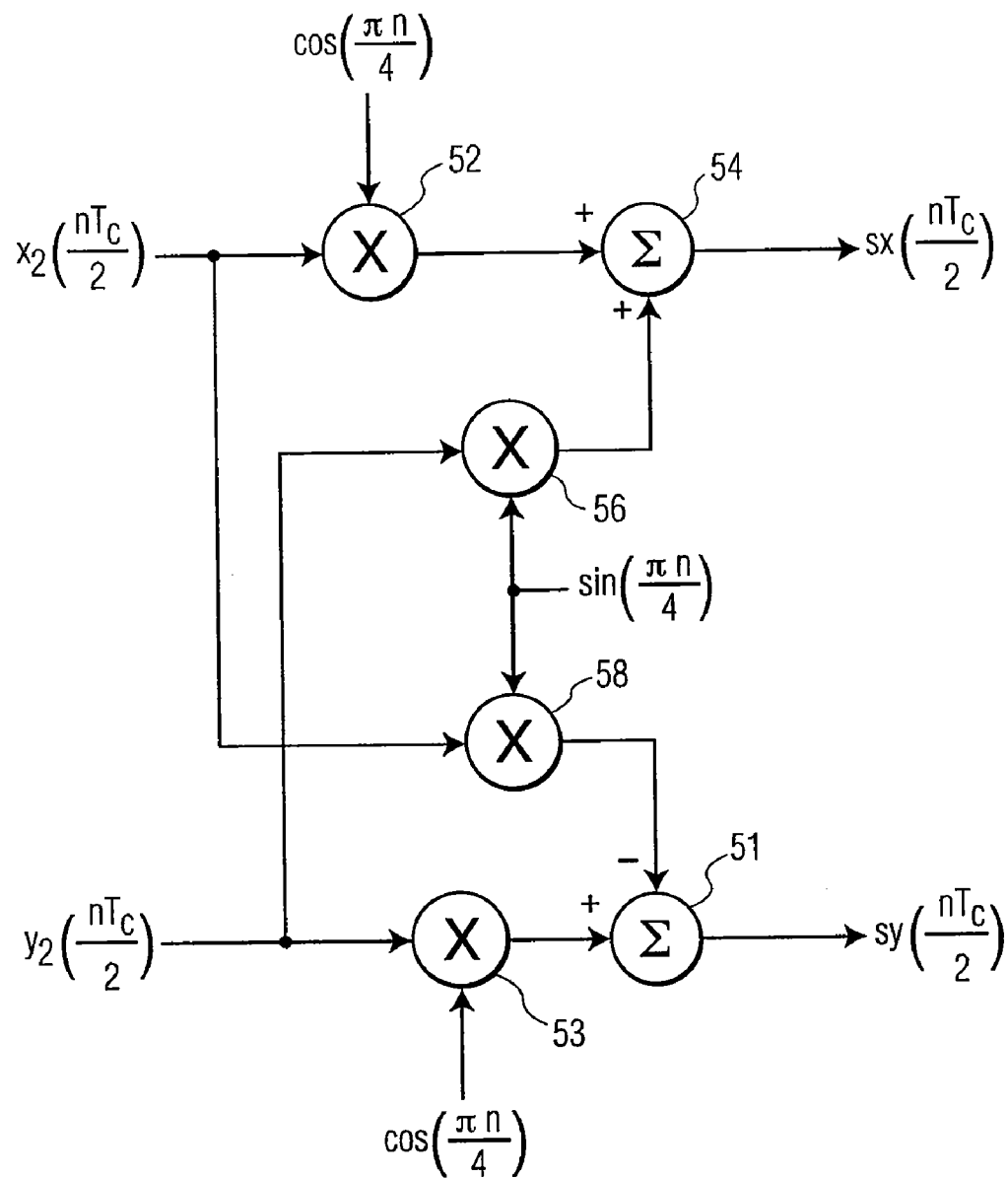
FIG. 5 is a block diagram of a phase rotator, in accordance with an embodiment of the present invention.
Figure 6:
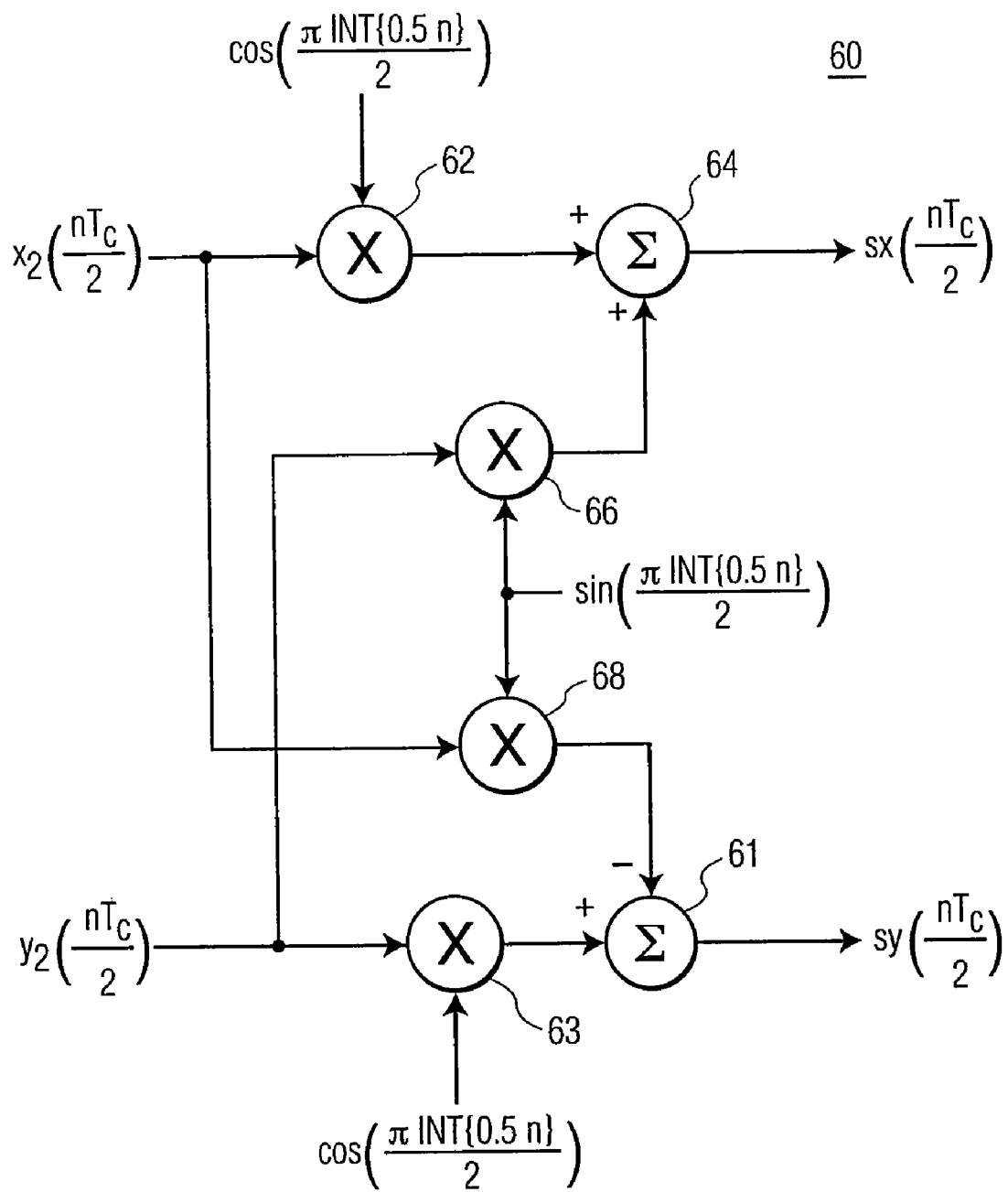
FIG. 6 is a block diagram of a modified phase rotator, in accordance with an embodiment of the present invention.

The phase rotator process may be implemented by a first phase rotator implementation as shown in FIG. 5 or a second simplified phase rotator implementation as shown in FIG. 6. The second simplified phase rotator offers lower complexity. The phase rotator is used to enable serial demodulation for offset quadrature pulse shaped signals.

As shown in FIG. 5, the I and Q chip matched filter outputs of the receiver, represented by $x_2(nT_c/2)$ and $y_2(nT_c/2)$, enter phase rotator 50 to be mixed with a $\cos(\pi n/4)$ signal at mixers 52 and 53 and a $\sin(\pi n/4)$ signal at mixers 56 and 58. The outputs from mixers 52 and 56 are combined by summer 54 and the outputs from mixers 58 and 53 are combined by summer 51 (actually a subtractor). The serial I {$sx(0.5nT_c)$} and Q {$sy(0.5nT_c)$} signals output from the phase rotator for 2 samples per chip, are decimated (FIG. 7) and sent to the SYNC detection module, shown in FIG. 8, and the timing control and rake tap processing section shown in FIG. 7.

As shown in FIG. 6, the I and Q chip matched filter outputs of the receiver, represented by $x_2(0.5nT_c)$ and $y_2(0.5nT_c)$, enter phase rotator 60 to be mixed with a $\cos(\pi \text{INT}\{0.5n\}/2)$ signal at mixers 62 and 63 and a $\sin(\pi \text{INT}\{0.5n\}/2)$ signal at mixers 66 and 68. The outputs from mixers 62 and 66 are then sent to summer 64 and the outputs from mixers 68 and 63 are sent to summer 61 (actually a subtractor). The serial I {$sx(0.5nT_c)$} and Q {$sy(0.5nT_c)$} signals output from phase rotator 60, represented in FIG. 6 by $sx(0.5nT_c)$ and $sy(0.5nT_c)$, are decimated and sent to the SYNC detection module shown in FIG. 8 and the timing control and rake tap processing section shown in FIG. 7.

The second simplified phase rotator implementation provides a repetitive mapping structure of 8 samples on both the serial I and Q signal, as shown below:

$$sx(0.5\ nT_c) = \{x_2(0), x_2(0.5T_c), y_2(T_c), (1.5T_c), -x_2(2T_c),$$
$$31\ x_2(2.5T_c), -y_2(3T_c), -y_2(3.5T_c), \ldots\}$$ (eqn 10)

and $$sy(0.5nT_c) = \{y_2(0), y_2(0.5T_c), -x_2(T_c), -x_2(1.5T_c), -y_2(2T_c), -y_2(2.5T_c), x_2(3T_c), x_2(3.5T_c), \ldots\}$$ (eqn 11)

The serial I and Q signals out of the phase rotator using the first phase rotator architecture are given by the following equations:

$$sx(0.5nT_c) = \qquad \text{(eqn 12)}$$
$$x_2(0.5nT_c + \Delta T_c) \cdot \cos\left(\frac{\pi n}{4} + \theta\right) + y_2(0.5nT_c + \Delta T_c) \cdot \sin\left(\frac{\pi n}{4} + \theta\right)$$

$$sy(0.5nT_c) = -x_2(0.5nT_c + \Delta T_c) \cdot \sin\left(\frac{\pi n}{4} + \theta\right) + \qquad \text{(eqn 13)}$$
$$y_2(0.5nT_c + \Delta T_c) \cdot \cos\left(\frac{\pi n}{4} + \theta\right)$$

where $\Delta T_c$ is the timing error ($\pm Tc/4$ maximum) not removed by the SYNC timing correction and $\theta$ represents one of the four possible timing conditions the phase rotator may be in, depending on timing error. The phase associated with the phase rotator may be equal to either $-90, 0, 90$ or $180$ degrees, for example.

The first phase rotator is selected as an exemplary implementation to show how to simplify the mathematical equations, resulting in the second simplified phase rotator. The second simplified phase rotator, however, introduces an additional phase change of $-45$ degrees every other sample. Those skilled in the art will recognize that the results derived using the exemplary first phase rotator implementation may be applied to the second simplified phase rotator architecture.

Inserting the equations for $x_2(0.5nT_c)$ and $y_2(0.5nT_c)$ and applying simplifications (see, e.g., derivation in D. J. Rasmussen, "Serial Demodulation of Offset Quadrature Pulse-Shaped Signals," PhD Dissertation, Arizona State University, May 1993, pp. 11-50) to these equations yield:

$$sx(0.5nT_c) = \qquad \text{(eqn 14)}$$
$$\left[\sum_{i=0}^{2M-1} c_i \cdot g([0.5nT_c + \Delta T_c] - iT_c) \cdot \cos\left(\frac{\pi[0.5nT_c - iT_c]}{2T_c}\right)\right]$$
$$\cos(\theta_c) - \left[\sum_{i=0}^{M-1} c_i \cdot g([0.5nT_c + \Delta T_c] - iT_c) \cdot \right.$$
$$\left. \sin\left(\frac{\pi[0.5nT_c - iT_c]}{2T_c}\right)\right] \sin(\theta_c)$$

and $$sy(0.5nT_c) = \qquad \text{(eqn 15)}$$
$$-\left[\sum_{i=0}^{2M-1} c_i \cdot g([0.5nT_c + \Delta T_c] - iT_c) \cdot \cos\left(\frac{\pi[0.5nT_c - iT_c]}{2T_c}\right)\right]$$
$$\sin(\theta_c) - \left[\sum_{i=0}^{M-1} c_i \cdot g([0.5nT_c + \Delta T_c] - iT_c) \cdot \right.$$
$$\left. \sin\left(\frac{\pi[0.5nT_c - iT_c]}{2T_c}\right)\right] \cos(\theta_c)$$

where $\theta_c = \theta + \phi$ (eqn 16)

The phase error introduced by the down-conversion operation ($\phi$) and the phase error introduced by the phase rotator ($\theta$) is combined into a total carrier phase error term ($\theta_c$). From these equations, two features of serial demodulation may be observed. First, the serial formatting factor $(-1)^i$ from the modulation equation (see, e.g., eqn 1) is removed. Second, the I and Q baseband signals consist of the filtered SYNC sequence multiplied by either a cosine or a sine weighting function.

Referring back to FIG. 4, the QBL-MSK autocorrelation function is nonzero for $\pm 2.5\ T_c$ about the ideal SYNC time (i.e., t equal to zero). Since the cosine weighting function forces the QBL-MSK autocorrelation function to zero at times $-T_c + \Delta T_c$ and $T_c + \Delta T_c$, only the QBL-MSK terms at $-2T_c + \Delta T_c$, $\Delta T_c$, and $2T_c + \Delta T_c$ need to be considered for each cosine weighted QBL-MSK autocorrelation chip response. Similarly the sine weighting function forces the QBL-MSK autocorrelation function to zero at times $-2T_c + \Delta T_c$, $\Delta T_c$, and $2T_c + \Delta T_c$, so only the QBL-MSK terms at $-T_c + \Delta T_c$ and $T_c + \Delta T_c$ need to be considered for each sine weighted QBL-MSK autocorrelation chip response.

Figure 7:
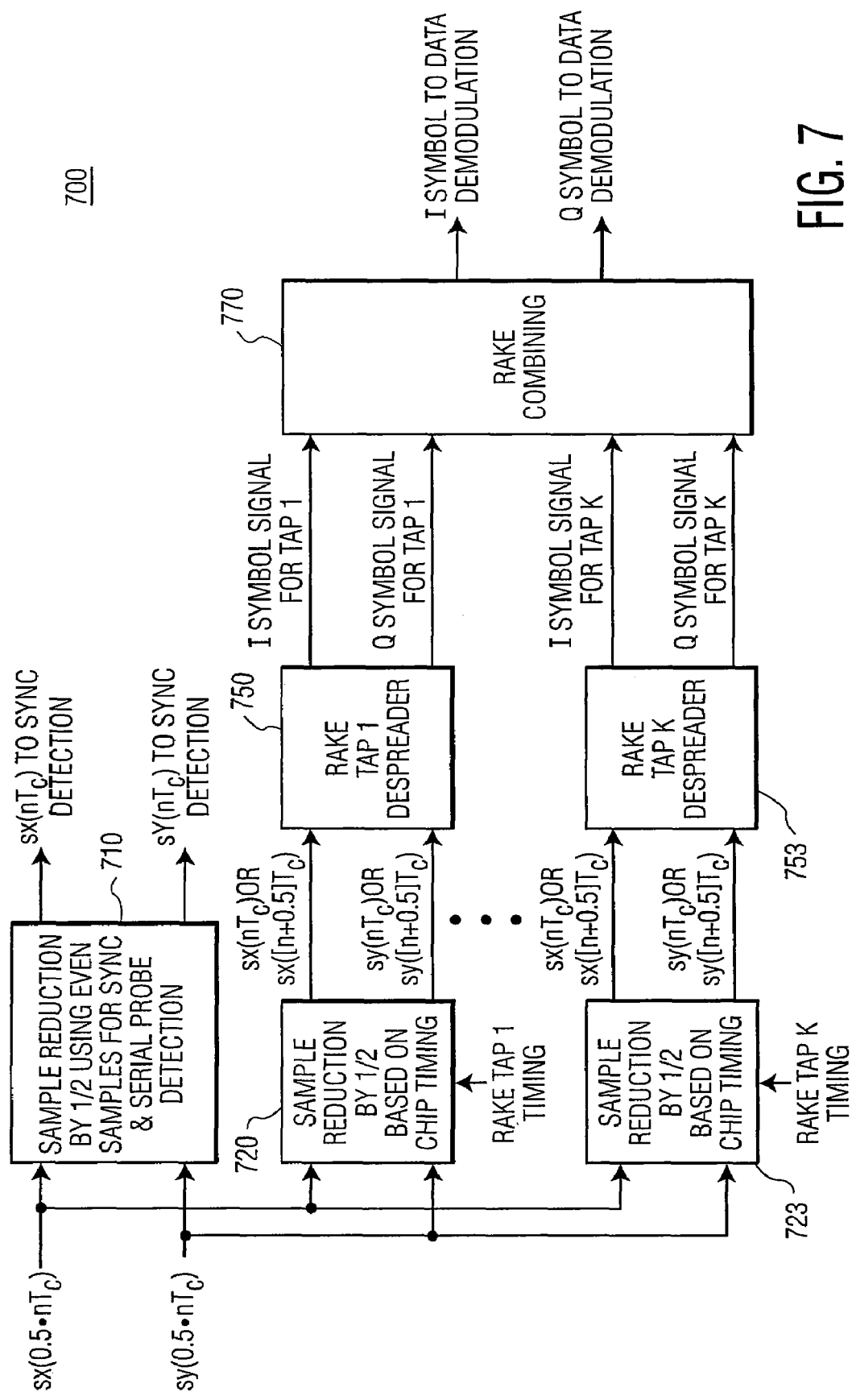
FIG. 7 is a block diagram of timing control & rake tap processing, in accordance with an embodiment of the present invention.

The phase rotator outputs, obtained above, are then sent to timing control and rake tap processing section 700 shown in FIG. 7. Following the phase rotator operation (e.g., FIGS. 5 and 6), sample rate reduction is performed by decimator 710 and decimators 720 to 723, which are controlled by the timing determined by the SYNC detection and serial probe operation (e.g., FIG. 8). In one embodiment, the sampling rate is reduced from 2 samples per chip to 1 sample per chip for both SYNC/serial probe processing (i.e., by decimator 710), and rake processing (i.e., by decimators 720 to 723), corresponding to rake tap despreaders 750 to 753 and rake combiner 770.

Figure 8:
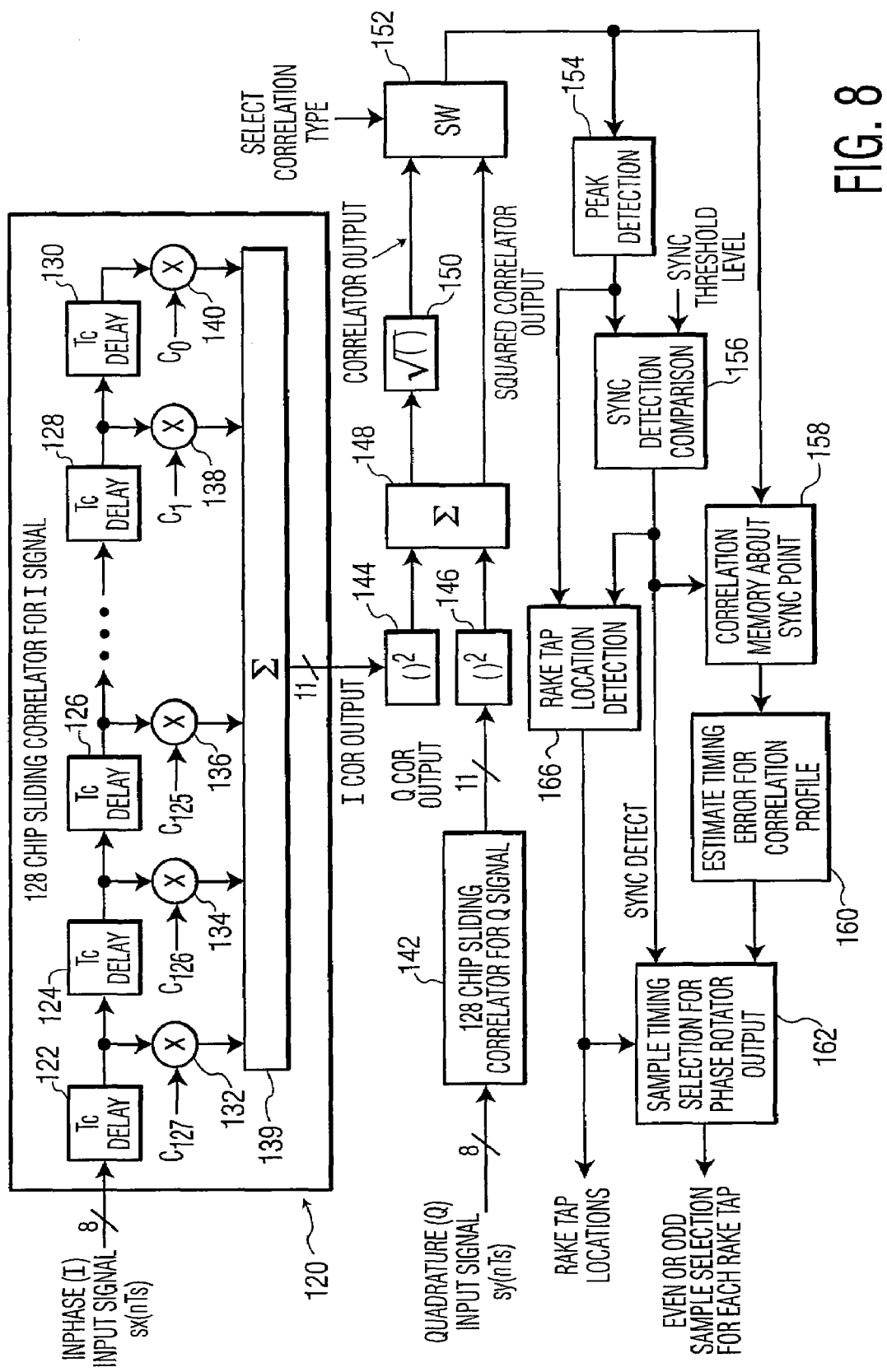
FIG. 8 is a block diagram of a SYNC detection module, in accordance with an embodiment of the present invention.

FIG. 8 shows an exemplary SYNC/serial probe detection module that may be used to establish the proper timing in the despreading operation for each of the rake taps (e.g., shown in FIG. 7). To reduce complexity, the SYNC/serial probe module may be operated at the chip rate, which corresponds to $T_s = T_c$. The SYNC/serial probe module may also be operated at twice the chip rate (i.e., $T_s = 0.5 \cdot T_c$); operation at this sampling rate enables the module to obtain the proper rake tap timing directly for the rake tap locations. Operating at the chip rate, on the other hand, requires a timing selection to be made using the SYNC/serial probe correlation curve.

FIG. 8 shows the SYNC/serial probe detection module using a synchronization length of 128 chips, which are coherently combined. This SYNC/serial probe length may be shortened or lengthened depending on the application. It will be appreciated that the full 128 chip correlation does not need to be coherently combined over the full 128 chip sequence. For example, the 128 chip correlation may be coherently combined over 32 chip segments, followed by a noncoherent combining of the resulting four 32 chip segments. Neither the SYNC/serial probe sequence length nor the correlation structure shown are unique to the timing correlation process.

The sliding chip correlators 120 and 142 for the input I and Q signals, respectively, as exemplified in FIG. 8, include a sliding length of 128 chips, represented by delay elements 122, 124, 126, 128 and 130, which are, respectively, coupled to mixers 132, 134, 136, 138 and 140 for multiplication with respective spreading code signals of $c_{127}$, $c_{126}$, $c_{125}$, ..., $c_0$. The 128 mixed signals are summed by summer 139 in sliding chip correlator 120.

As shown in FIG. 8, the I and Q correlator output signals are, respectively, squared by squaring functions 144 and 146, then combined by summer 148. SYNC detection, it will be understood, may be determined by using either the square of the correlation output or of the correlation output (generated by square root module 150). Either correlation output may be used, but a different timing error mapping needs to be implemented.

As shown, the correlator output, which is selected by switch 152, may be implemented using the following equation:

$$COR(n) = \text{Max}\{MAG[ICOR(n)], MAG[QCOR(n)]\} + \frac{1}{2} \cdot \text{Min}\{MAG[ICOR(n)], MAG[QCOR(n)]\}; \quad \text{(eqn 17)}$$

where Max{ } is the maximum value of its two arguments, Min{ } is the minimum value of its two arguments, and Mag[ ] is the magnitude of its argument.

Figure 9:
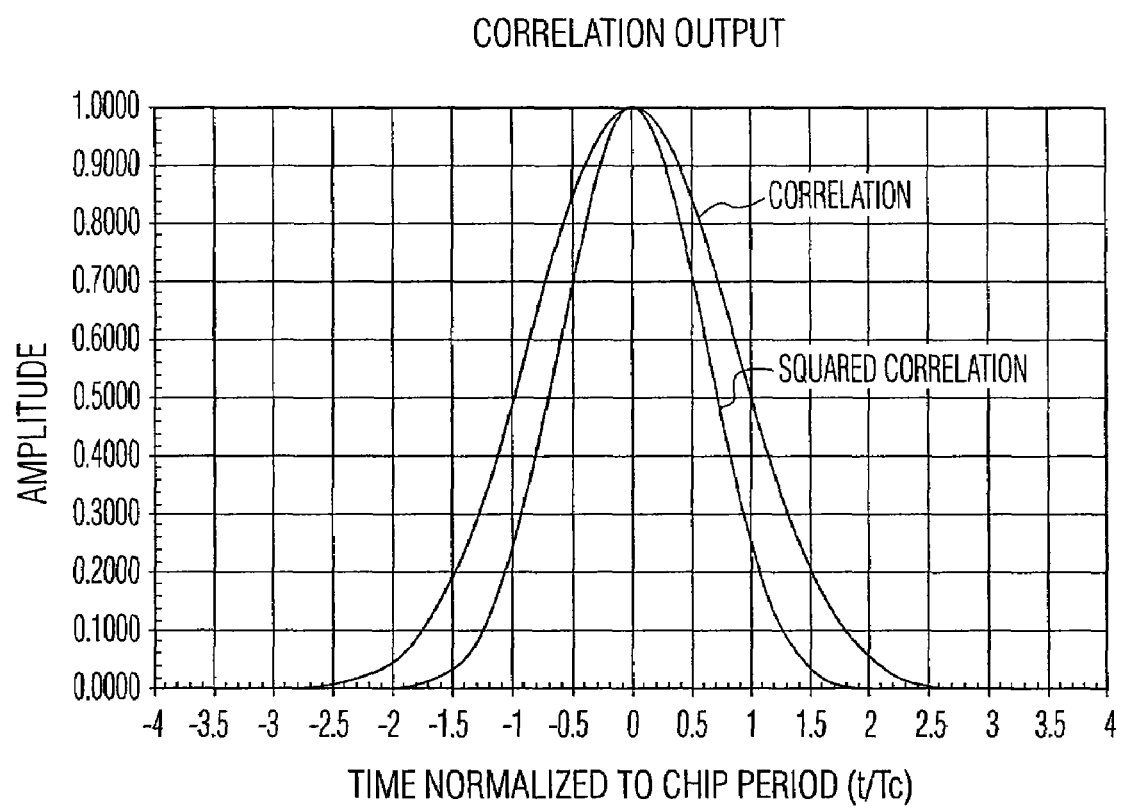
FIG. 9 is a plot of a SYNC correlation curve, for use with the SYNC detection module of FIG. 8.

The signal used as an input signal to peak detection module 154, for each of the two different correlation outputs are shown in FIG. 9. For the square-root output, the correlation signal to the peak detector is the QBL-MSK autocorrelation function, while the squared output is the square of the QBL-MSK autocorrelation function. The correlation response for the squared QBL-MSK autocorrelation function is sharper than the QBL-MSK autocorrelation function, as expected. It will be appreciated that the QBL-MSK autocorrelation function is shown in FIG. 4 and described in the specification, at page 12, lines 2-11, as the function g(t). As a result of this g(t) profile, shown in FIG. 4, the I and Q signals out of the chip matched filter (36 and 37 in FIG. 3) are the $X_2$ and $Y_2$ signals, respectively shown in Equations 8 and 9 (page 12).

The signal outputted from switch 152 is either a cross correlation output from module 150 or a squared cross correlation output from module 148. Both cross correlation outputs (originating from cross correlators 120 and 142) are shown in FIG. 9. Examination of the autocorrelation profile shown in FIG. 4 and the cross correlation profile shown in FIG. 9 lead to a conclusion that both profiles are identical.

Since the correlation response is different, depending on the input signal, the time error estimation is also dependent on which input signal is used. By comparing the amplitude of three adjacent samples, peak detection module 154 determines if a peak has occurred at the center sample. If the center sample is declared to be a peak, the magnitude of that sample (peak sample) is compared to the SYNC threshold level by SYNC detection comparison module 156. If the magnitude of the peak sample is greater than the SYNC threshold, SYNC is declared by the SYNC detect signal sent to sample timing selection module 162, correlation memory 158, and rake tap location detector 166.

SYNC determines the time location of the first chip and whether even or odd samples are processed in the despreader for the first rake tap. If the SYNC process is operated at twice the chip rate, a SYNC point within $\pm 0.25 \cdot T_c$ is determined directly by the peak detection. For the SYNC process operated at the chip rate, the SYNC detection point along with the correlation profile is used to establish the SYNC point within a resolution of $\pm 0.25 \cdot T_c$, as described below.

Using the correlation output based on the QBL-MSK autocorrelation profile (or response) of FIG. 9 and operating the SYNC detection at the chip rate, an exemplary mapping to obtain a finer timing resolution ($\pm 0.25 \cdot T_c$) is outlined below:

select sample $nT_c - 0.5T_c$ if $COR(n-1) \geq 2 \cdot COR(n+1)$;
 $-Tc/2$ correction implemented;
 (odd sample before the even sample used in the SYNC detection); or
select sample $nT_c + 0.5T_c$ if $COR(n+1) \geq 2 \cdot COR(n-1)$;
 $+Tc/2$ correction implemented;
 (odd sample after the even sample used in the SYNC detection); or
select sample $nT_c$;
no correction if neither of the two above conditions are met;

where the SYNC/serial probe I and Q inputs are the even samples only, $COR(nT_c)$ is the peak location, $COR([n-1]T_c)$ is the sample before the peak, and $COR([n+1]T_c)$ is the sample following the peak. From these three relationships, the proper samples out of the phase rotator are passed on to the despreader for each rake tap selection.

As the SYNC/serial probe section of the waveform slides through the correlator, multi-path effects in the channel may produce additional peaks. These peaks may be used to identify the rake tap location using rake tap location detector 166. Rake tap locations along with their amplitudes are collected across the multi-path window. At the end of the multi-path window, the rake tap locations are ordered from strongest to weakest tap. Also, the rake tap strength is compared against a multi-path threshold. If the rake tap exceeds this threshold, the rake tap is kept.

Depending on the maximum number of rake taps provided by the rake processor, the number of rake tap locations may be reduced, with the weakest rake tap locations being removed. Rake tap timing is achieved by proper selection of the rake tap location and the even or odd sample associated with the rake tap location. By pairing the even sample with the following odd sample for a specified rake tap location $\{RL(k)\}$, the on time and the $+Tc/2$ correction are selected by the proper selection of the even or odd samples. To obtain the $-Tc/2$ correction, the rake tap location $\{RL(k)\}$ is moved back one position and the odd samples are selected. Proper control for each rake tap location and timing adjustment is given by the following relationships:

1) no correction: rake tap location: RL(k) and select even samples;
2) $+Tc/2$ correction: rake tap location: RL(k) and select odd samples; and
3) $-Tc/2$ correction: rake tap location: RL(k)−1 and select odd samples.

By selecting the proper rake tap location and even or odd sample (as estimated by timing error estimation module 160), the rake tap timing for each rake tap is provided by sample timing selection module 162.

Figure 10:
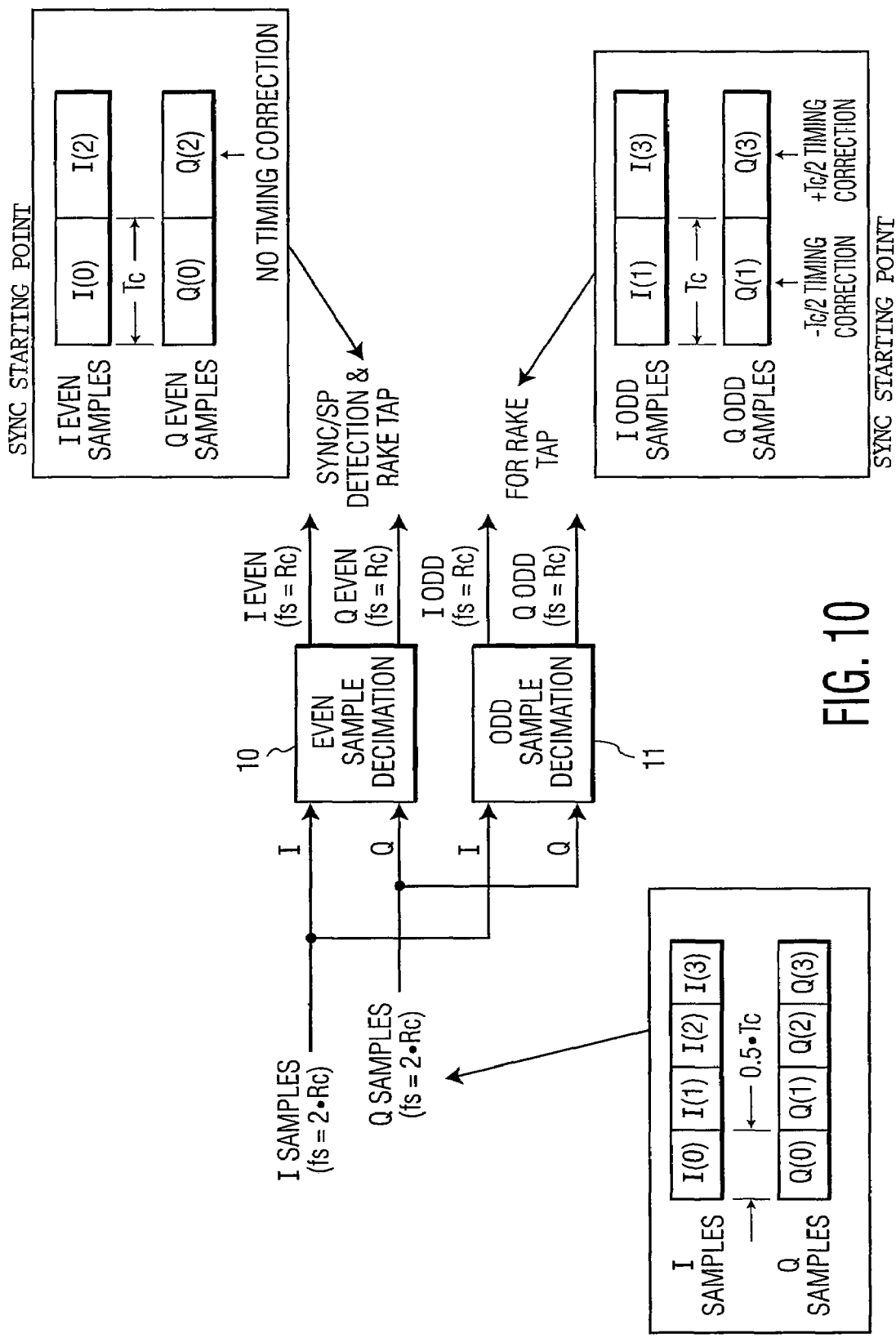
FIG. 10 is a block diagram illustrating execution of a timing alignment algorithm according to one embodiment of the present invention.

FIG. 10 shows the sample selection for the three different timing alignments for a rake tap with respect to the SYNC/serial probe sample. This sample selection provides a method for controlling each of the rake tap timing independently, enabling the closest to optimum sample timing for each rake tap.

As shown in FIG. 10, the I and Q samples are provided to even sample decimator 10 and odd sample decimator 11, which decimate the signals into I and Q even samples, and I and Q odd samples, respectively. Based on the calculated autocorrelation profile (described above), the synchronization starting point may be moved by one chip interval to I(1) and Q(1) (i.e., for a −Tc/2 timing correction) or to I(3) and Q(3) (i.e., for a +Tc/2 timing correction) and the odd samples are used. If no timing correction is necessary, the synchronization starting point is kept at I(2) and Q(2) and the even samples are used.

For other similar and non-similar disclosures, please refer to the following five applications filed on the same day as this application. These five applications are Ser. Nos. 11/314,123, 11/314,762, 11/313,476, 11/314,608 and 11/314,757 (and, respectively, correspond to the following five provisional applications 60/703,316; 60/703,180; 60/703,179; 60/703,320 and 60/703,095). These applications are all incorporated herein by reference in their entireties.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of correcting synchronization error, by a receiver, upon detecting a serial offset quadrature pulse shaped signal, the method comprising the steps of:
   (a) decimating, by the receiver, serial inphase (I) and quadrature (Q) signals to form decimated I and Q even samples and decimated I and Q odd samples;
   (b) obtaining, by the receiver, an autocorrelation profile of a spreading modulation signal used by the receiver;
   (c) detecting, by the receiver, a synchronization starting point using the decimated I and Q even samples; and
   (d) deciding, by the receiver, to either move, or not move, the synchronization starting point, based on the autocorrelation profile obtained in step (b).

2. The method according to claim 1, wherein step (d) decides to move the synchronization starting point, and uses the I and Q odd samples for subsequent despreading of the I and Q signals.

3. The method according to claim 1, wherein step (d) decides not to move the synchronization starting point, and uses the I and Q even samples for subsequent despreading of the I and Q signals.

4. The method according to claim 1, wherein step (d) decides to move, or not move the synchronization starting point by one chip interval.

5. The method according to claim 1, wherein step (a) decimates the serial I and Q signals from at least two samples per chip to a reduced sampling rate of one sample per chip.

6. The method according to claim 1, further comprising the steps of:
   (i) receiving, by the receiver, a quadrature pulse shaped signal modulated by a spreading sequence;
   (ii) down-converting, by the receiver, the quadrature pulse shaped signal to baseband I and Q signals; and
   (iii) rotating, by the receiver, phases of the baseband I and Q signals to form the serial I and Q signals.

7. A system for correcting timing in a quadrature pulse-shaped spread signal receiver, the system comprising:
   a demodulator front end of the receiver, for receiving a modulated signal and outputting digitized inphase (I) and quadrature (Q) signals;
   a phase rotator, coupled to the demodulator, for receiving the digitized I and Q signals and outputting serial I and Q signals;
   a decimator, coupled to the phase rotator, for receiving the serial I and Q signals and outputting decimated even sampled I and Q signals;
   a SYNC detection module, coupled to the decimator, for receiving the decimated even sampled I and Q signals and outputting a plurality of rake tap locations and rake tap timing corrections for the respective rake tap locations; and
   a rake tap processing section, coupled to the SYNC detection module, for receiving the serial I and Q signals and the rake tap timing corrections and outputting I and Q symbols for subsequent data processing.

8. The system according to claim 7, wherein the demodulator includes:
   a plurality of mixers for multiplying the received modulated signal with a carrier signal to obtain baseband I and Q signals;
   a plurality of low-pass filters for removing undesirable multiplied terms from the baseband I and Q signals; and
   a plurality of analog-to-digital converters (ADCs) for digitizing the filtered I and Q signals.

9. The system according to claim 8, wherein the demodulator includes a plurality of matched filters for increasing a signal-to-noise ratio of the digitized I and Q signals.

10. The system according to claim 7, wherein the SYNC detection module includes:
    a correlator for correlating the decimated even sampled I and Q signals with a spreading code signal and providing I and Q correlator outputs;
    a peak detection module, coupled to the correlator, for detecting peaks in the combined I and Q correlator output;
    a SYNC comparison module, coupled to the peak detection module, for comparing the detected peaks with a SYNC threshold level and providing an indication when the detected peaks are greater than the SYNC threshold level;
    a rake tap location detector, coupled to the peak detection module and the SYNC comparison module, for outputting locations of rake taps corresponding to the detected peaks indicated to be greater than the SYNC threshold level;
    a correlation memory for storing an autocorrelation profile of a spreading modulation signal of the receiver;
    a timing error estimation module, coupled to the correlation memory, for estimating a timing error in the correlator output compared to the stored autocorrelation profile; and
    a sample timing selection module, coupled to the SYNC comparison module and the timing error estimation module, for issuing the rake tap timing corrections based on the estimated timing error.

11. The system of claim 10, wherein the correlator includes:
    a first sliding correlator for correlating the serial I signal with the spreading code signal and outputting the I correlator output;
    a second sliding correlator for correlating the serial Q signal with the spreading code signal and outputting the Q correlator output;
    at least one squaring module for squaring the I and Q correlator outputs; and
    a summer for summing the squared I and Q correlator outputs and outputting the correlation signal.

12. The system of claim 11, wherein the correlator further includes:
a square root module for calculating a square root of the squared I and Q correlator outputs to form the correlation signal.

13. The system according to claim 7, wherein the rake tap processing section includes:
a plurality of sample reduction modules coupled to the phase rotator and the SYNC detection module, for reducing the serial I and Q signals to a predetermined sample rate for each of the rake tap locations;
a plurality of rake tap despreaders, coupled to respective sample reduction modules, for despreading each of the sample reduced I and Q signals and provide a plurality of I and Q rake tap symbols; and
a rake tap combiner, coupled to the rake tap despreaders, for combining the I and Q rake tap symbols to provide the I and Q symbols for subsequent data processing.

14. The system of claim 13, wherein the predetermined sample rate is one half of the received sample rate.

15. The system of claim 7, wherein the quadrature pulse-shaped spread signal receiver is configured to receive one of a quasi-bandlimited minimum shift keying (QBL-MSK) spreading modulation signal, an offset quadrature phase shift keying (OQPSK) spreading modulation signal, a minimum shift keying (MSK) spreading modulation signal, a Gaussian MSK spreading modulation signal, a tamed frequency modulation (TFM) spreading modulation signal, an intersymbol jitter free offset quadrature phase shift keying (IJF-OQPSK) spreading modulation signal, a raised cosine filtered offset quadrature phase shift keying (RC-OQPSK) spreading modulation signal, or a bandwidth efficient continuous phase modulation (CPM) spreading modulation signal.

16. In a receiver, a method of timing a correction for demodulation of a quadrature pulse shaped signal, the method comprising the steps of:
(a) obtaining, by the receiver, serial I and Q signals from the quadrature pulse shaped signal;
(b) decimating, by the receiver, the serial I and Q signals to obtain even and odd I samples and even and odd Q samples;
(c) selecting, by the receiver, the even or the odd samples for each of a plurality of rake taps based on a correlation profile of the serial I and Q signals;
(d) obtaining, by the receiver, I and Q symbols for each of the rake taps by despreading either the even or the odd I and Q samples, based on the determination in step (c); and
(e) combining, by the receiver, the I and Q symbols of each of the rake taps to form combined I and Q symbols for subsequent data processing.

17. The method according to claim 16, wherein step (a) includes:
(i) receiving a quadrature pulse shaped signal modulated by a spreading sequence;
(ii) down-converting the quadrature pulse shaped signal to baseband I and Q signals; and
(iii) rotating phases of the baseband I and Q signals to form the serial I and Q signals.

18. The method according to claim 16, wherein step (b) includes decimating the serial I and Q signals to a sample rate of one sample per chip.

19. The method according to claim 16, wherein step (c) includes:
(i) obtaining an autocorrelation profile of a spreading modulation signal used by the receiver;
(ii) determining a crosscorrelation profile of the serial I and Q signals;
(iii) detecting a synchronization starting point using the even I and Q samples; and
(iv) moving the synchronization starting point by one chip interval, based on the autocorrelation profile obtained in step (i) and the crosscorrelation profile determined in step (ii).

20. The method according to claim 19, wherein step (d) includes obtaining the I and Q symbols by despreading the odd I and Q samples immediately following the synchronization starting point, when the correlation profile calculated in step (ii) is centered to the right of the autocorrelation profile calculated in step (i).

21. The method according to claim 19, wherein step (d) includes obtaining the I and Q symbols by despreading the odd I and Q samples immediately preceding the synchronization starting point, when the correlation profile calculated in step (ii) is centered to the left of the autocorrelation profile calculated in step (i).

* * * * *